United States Patent [19]

Natale

[11] Patent Number: 4,604,111
[45] Date of Patent: Aug. 5, 1986

[54] PARTICULATE CONTAMINATION CONTROL METHOD AND FILTRATION DEVICE

[76] Inventor: Anthony Natale, 450 S. Fork Landing Rd., Maple Shade, N.J. 08052

[21] Appl. No.: 735,716

[22] Filed: May 20, 1985

Related U.S. Application Data

[63] Continuation of Ser. No. 323,730, Nov. 23, 1981, abandoned.

[51] Int. Cl.⁴ .................................................. B01D 46/42
[52] U.S. Cl. ............................................... 55/97; 49/68; 55/385 A; 55/419; 55/467; 98/33.1; 160/332; 160/DIG. 8; 312/1; 312/3
[58] Field of Search ............... 55/97, 274, 385 A, 419, 55/467, DIG. 29, 212, 213, 420; 98/33.1, 34.5, 42.02, 36, 42.05, 87; 49/68; 160/332, DIG. 8; 128/1 R; 422/120; 312/1, 3

[56] References Cited

U.S. PATENT DOCUMENTS

| | | |
|---|---|---|
| 2,710,574 | 6/1955 | Runion . |
| 2,927,659 | 3/1960 | Pabst et al. .................... 55/274 X |
| 2,983,213 | 5/1961 | Bohanon ............................. 98/33 A |
| 3,107,974 | 10/1963 | Potapenko . |
| 3,158,457 | 11/1964 | Whitfield ...................... 55/385 A X |
| 3,201,772 | 8/1965 | Ladusaw ........................... 55/274 X |
| 3,261,050 | 7/1966 | Caille et al. .......................... 49/68 X |
| 3,334,597 | 8/1967 | Ruskin et al. ................. 55/385 A X |
| 3,375,640 | 4/1968 | Pelosi, Jr. . |
| 3,501,213 | 3/1970 | Trexler ............................... 49/68 X |
| 3,552,098 | 1/1971 | Cochran . |
| 3,576,206 | 4/1971 | Trexler ................................ 312/1 X |
| 3,601,030 | 8/1971 | Bryant . |
| 3,601,031 | 8/1971 | Abel et al. ..................... 55/385 A X |
| 3,629,999 | 12/1971 | Marsh et al. . |
| 3,766,844 | 10/1973 | Donnelly et al. ............. 55/385 A X |
| 3,875,853 | 4/1975 | Pielkenrood ............. 55/DIG. 29 X |
| 3,936,284 | 2/1976 | Mason . |
| 3,960,527 | 6/1976 | Goettl ............................... 55/419 X |
| 4,072,483 | 2/1978 | Doyle, Jr. ......................... 55/467 X |
| 4,086,950 | 5/1978 | Power .................................. 160/332 |
| 4,091,719 | 5/1978 | Galloway ............................. 98/33.1 |
| 4,175,934 | 11/1979 | Lang et al. . |
| 4,191,543 | 3/1980 | Peters . |
| 4,255,169 | 3/1981 | Leliaert et al. ........................ 55/97 |
| 4,257,471 | 3/1981 | Thurmond, Jr. .................... 160/332 |
| 4,267,769 | 5/1981 | Davis et al. .............. 55/DIG. 29 X |
| 4,294,595 | 10/1981 | Bowerman ..................... 55/274 X |
| 4,304,224 | 12/1981 | Fortney ........................ 55/385 A X |
| 4,312,396 | 1/1982 | McKinnon et al. ................ 160/332 |
| 4,384,606 | 5/1983 | Johnston et al. ................... 160/332 |

FOREIGN PATENT DOCUMENTS 2440221  3/1976  Fed. Rep. of Germany ... 55/385 A

OTHER PUBLICATIONS

"Industrial Clean Rooms", *Air Conditioning, Heating and Ventilating*, Dec., 1963, pp. 58–63.
"Environmental Enclosures Clean Rooms and Components", Moore and Hanks Co., El Monte, Calif.

*Primary Examiner*—Kathleen J. Prunner
*Attorney, Agent, or Firm*—Fleit, Jacobson, Cohn & Price

[57] ABSTRACT

A negative pressure method and apparatus for protection from airborne asbestos and other particulate contamination is disclosed, including an enclosure with doorways and decontamination chambers with an air intake through the decontamination chambers with at least one filtration unit flow connected with the enclosure, with a blower to pull air into the filtration unit and dispelling the filtered air to the atmosphere. A high volume air flow intake is maintained with a significant negative air pressure in the enclosure. A filtration device is provided with multiple entrance ports providing for a large flow of air through the body of the room together with individual entrance ports to receive the discharge from separate vacuum cleaners.

17 Claims, 8 Drawing Figures

PARTICULATE CONTAMINATION CONTROL METHOD AND FILTRATION DEVICE

This application is a continuation of application Ser. No. 323,730 filed Nov. 23, 1981, and now abandoned.

BACKGROUND OF THE INVENTION

This invention relates to the serious dangers associated with persons breathing particulate contaminated air. This invention is particularly useful for protecting the outside environment and the individuals working in a highly contaminated area such as occurs when asbestos coatings are being removed inside a building structure. Asbestos fibers fall into the generic classification of hazardous particulate and are a well known carcinogenic hazard to humans and animals. Typical environmental standards refer to fibers that are 5 microns or greater in length with an aspect ratio of 3 to 1 or greater. The standards presently in use utilize a phase contrast optical microscope with about 440 magnification. These testing methods are not capable of seeing fibers below about 0.3 micron in diameter. Actually, the average asbestos fiber is about 0.1 micron in diameter. Therefore, using the present standards and equipment, for every fiber counted there is present as many as 30 fibers uncounted. This is coupled with the standard that fibers shorter than 5 microns in length are not considered. It is now accepted that the thinner fibers are the most dangerous threat to human health. While present standards indicate "satisfactory condition" with concentrations less than 2.0 fibers per cubic centimeter, this, in reality, means that the standards allow an actual concentration of about 60 fibers per cubic centimeter, if the thinner fibers were counted. The asbestos fibers, in particular those that are thinner and shorter remain airborne for considerable lengths of time and contaminate large volumes of air to form a substantial hazard to the environment and to the persons working or living in the area. A typical requirement standard of requiring that the area "settle" for 24 hours before allowing persons to re-enter in order to clean up settled asbestos fibers is clearly insufficient for protection. The thinner fibers remain airborne for up to 80 hours and it is now clear that re-entry into the room stirs up the fibers to pose the same hazard. Wet removal processes for removal of an offending coating containing asbestos fibers utilize a "wetting down" process of the removed coating. It is now clear that this process still allows large amounts of fibers to enter and remain in the surrounding air space. New proposed standards provide for reduction and maintenance of a fiber level to 0.1 fibers per cubic centimeters of air using the optical microscope techniques. Scanning electron microscopes indicate that even at that reduced level there is in reality about 3 fibers per cubic centimeter including the thinner and smaller fibers. My invention is particularly directed to reducing the hazards involved with either dry or wet removal of asbestos containing material and is aimed at reducing the fiber content to 0.01 fibers per cubic centimeter including the thin and shorter fibers as small as 0.1 microns diameter and 2 microns in length, using a scanning electron microscope (sem) with a 6,000 to 10,000 magnification.

While most of the description of my method and the devices used sith the method relate to control of asbestos fiber contamination, it should be understood that my method and device can be used to protect the workers and the outside environment from a wide variety of offending particulate contamination.

Many asbestos removal projects relate to buildings or large rooms that have substantial logistical problems such that the ability to seal off the area is prevented. Systems have been provided that attempt to seal off the room, or the building from the outside environment such that when the job is completed, all of the contamination will have been kept within a certain area. However, buildings are typically not designed to be absolutely sealed off, leaks occur and the outside environment is contaminated. Further, during the removal, the workers are subjected to a substantial risk due to the high concentration build-up.

Air purifiers in a variety of configurations have been available for some time. In particular, air filtration systems have been equipped with a plenum attachment to provide a "source capture" fume collector such as those used to remove welding smoke and fumes from soldering, welding, or brazing locations. These air purifiers are provided with a non-collapsible duct work which has its entrance point close to the area of contamination. Plenums can provide for one or two inlets for more than one welding location. Filter systems with a series of filters in the flow line provide what is described as near complete filtration of particulate out of the air stream.

U.S. Pat. No. 3,334,597 to F. R. Ruskin, et al, describes a radiation-proof structure, wherein a self-contained air generating and re-generating unit provides required air when the shelter is closed up tight in use. U.S. Pat. No. 4,178,159 to Fecteau describes a clean room filter assembly to provide a totally sealed air delivery system for a clean room. In U.S. Pat. No. 2,710,574, H. E. Runion decribes a room in which there are one or more machines or devices which produce paper dust or similar atmospheric matter which is desirable to remove. His system is a filter medium device. U.S. Pat. No. 4,040,042, to Horst Mayer describes an exhaust apparatus and monitoring circuit therefor to monitor the operation of the fan in response to contamination of the filter. U.S. Pat. No. 2,838,130 to L. E. Lemmon describes an air conditioner that will automatically shut off the air into the compartment of an auto. C. E. Hollingsworth in U.S. Pat. No. 2,299,620 describes a series of filters, one for low veocity dust, one for electrostatic type and the final one being an adsorbent type. An air filtering apparatus is described in U.S. Pat. No. 3,936,284 to Donald G. Mason with a filter system of spun fiberglass mat/adsorptive charcoal and a HEPA-type filter panel. The HEPA type filter is an acronym for High Efficiency Particulate air filter as covered by Federal Standard 209 and Military Standard 282 and described in U.S. Pat. No. 3,498,032, incorporated herein by reference. This type of filter is also known in the industry as the "absolute" filter. U.S. Pat. No. 4,175,934 to Arnold Lang describes a "clear air device" utilizing a preliminary filter and a HEPA filter. U.S. Pat. No. 4,191,543 to Max D. Peters also describes an apparatus using a HEPA filter.

None of the prior art having satisfied the needs in the industry to protect the workers in an area of highly dangerous particulate level and, in particular, high asbestos fiber levels, the following are objects of my invention:

An object of my invention is to provide a method of containing, lowering, and essentially eliminating the danger of asbestos inhalation by workers in a building in which asbestos fibers are being generated at extremely high levels.

It is a further object of this invention to provide a method of protecting the outside environment from asbestos particulate contamination during the removal of asbestos coatings from the inside walls of the building, despite the fact that the area targeted for coating removal cannot be made air-tight.

An additional object of this invention is to prevent asbestos fiber release into the outside environment that might occur in an unforseen accident such as a leak through a damaged barrier.

A further object of this invention is to remove the offending particulate away from workers breathing zones while they work toward cleanup of the building, such that more comfortable half-face respirators may be used by the workers.

An additional object of this invention is to reduce the overall fiber counts in the work area generating high quantities of asbestos fibers into the air.

An additional object of this invention is to reduce the humidity and heat build up inside the barrier where the asbestos cleanup is taking place so that the necessary safety clothing does not become intolerable.

It is a further object of this invention to provide a filtration unit that is portable in size and easy to handle.

It is an additional object of this invention to provide a filtration device that provides easy access to disposable filters.

It is a further object of this invention to provide warning lights to indicate proper functioning of the filters, automatic shut-down with a warning light when a filter is not in place and a filter becomes ineffective or the exhaust is obstructed Further indicators should show the air delivery and a warning light to indicate reduced air flow due to dirty filter or obstructed intake still allowing time to shut down before any contamination takes place.

It is an additional object of this invention to provide a filtration device which indicates the accumulated time of operation with the filter in place so as to be able to remove the course filter before the finer filters are clogged.

It is an additional object of this invention to provide a filtration device and method wherein the personnel can depart from the work area, complete the decontamination process without subjecting them to a down time when the air is not being filtered.

It is an additional object of this invention to provide a filtration device which will draw off high fiber concentration from an immediate work area wherein covering the entire room is impractical.

It is a further object of this invention to provide a method and a filtration device which will provide working conditions wherein the contaminating particulate is always being continuously drawn away from the worker and not past the worker before being removed from the work area.

It is a further object of this invention to draw airborne asbestos fibers to the filtration system rather than allowing the fibers to circulate within the work area and settling back into the clean areas within the work area or in the outside environment.

SUMMARY OF THE INVENTION

In order to solve the substantial safety problems described above, I have invented a method of containing and lowering the level of particulate contamination in an area that is environmentally in communication with a source generating a high level of particulate contamination harmful to the human body either on a short term or long term basis. In particular, this method is suitable to aid in protection of the persons actually in an area generating a high level of particulate contamination, such as when an area or room includes a pipe, wall or ceiling with an asbestos containing coating in the process of removal. My method includes utilizing an existing enclosure or providing an enclosure around the source of particulate generation. This enclosure is preferably large enough to include the entire area being cleaned and preferably includes at least one sealed film enclosure wall. An existing doorway is used or a doorway is placed in a wall or conceivably in a ceiling or floor of the enclosure to provide entrance and exit to and from the enclosure. A decontamination chamber space, connected to the doorway is provided. Preferably, this contamination chamber includes three separated rooms, so as to essentially eliminate the possibility of carrying the particulate contamination to the outside environment. A second doorway is provided in a wall of the decontamination chamber to provide entrance to and exit from that chamber to the outside environment. At least one air intake is provided in the enclosure to allow air flow to enter into the enclosure through the decontamination chamber. Whenever the term "wall" or "walls" is used, it is intended to include the ceiling, the floor, and any of the vertical walls of the room and as such is not intended to be a limitation on the location of a door, an air intake or any of the other elments of the method of my invention. The air intakes also preferably prevent air flow from inadvertently leaving the enclosure. A controlling system is preferably provided to control the amount of air entering through the intakes so that there is substantial air flow entering each intake.

At least one filtration device is located in environmental contact with the air space in the enclosure. In most embodiments of my invention, the filtration device is located inside the enclosure and throughout this specification and the claims, the filtration device is shown sitting inside the enclosure or in the walls of the enclosure. My invention also includes locating the filtration device outside of the enclosure in air flow communication with the enclosure through a non-collapsible tube arrangement. While not preferred, it should be understood that the location of the filtration means is not critical so long as it is in a position to receive large volumes of air from the enclosure and expel the filtered air to the environment outside the enclosure. This location is intended to be included in the phrase "in the enclosure". The filtration device includes a blower to pull air into the device. At least one filter is placed in the air stream inside the filtration device to remove essentially all particulate from the air. Preferably, there is a series of three filters, connected such that the air must pass through all three filters in series of increasing efficiency until at least 99.99 percent of the offending particulate greater than 0.3 microns in length is removed from the air by the finest filter. An entrance port is provided in the filtration device to receive air flow to the filters. An exit port is provided to allow the air flow to exit the filtration device to the environment outside the enclosure and preferably to a communication device to carry the air flow from the exit port to an exit opening in the enclosure and to the outside environment. This exit opening in the enclosure is, preferably, sealed from air loss from the room except that passing through the filtration device.

The filtration device is preferably provided with an entrance chamber into which the entrance port opens and from which the air enters into the series of filters. In this preferred embodiment, at least one additional entrance port is provided of a size and shape to receive and couple with a hose which will not collapse under mild vacuum conditions, the end of which is attached to a vacuum cleaner equipped to pick up quantities of particulate. These second entrance ports are preferably two or three in number and are equipped with a closure device to allow closure when not in use. The second entrance ports are positioned to discharge particulate into the air stream entering the primary entrance part of the filter.

A key element of this invention is providing a negative air pressure in the enclosure and sufficient air flow to carry the particulate to the filtration means. Preferably this means sufficient air flow to change the air about every 5 to about 25 minutes, more preferably about every 10 to about 20 minutes, and most preferably about every 15 minutes.

One of the objects of this invention is to provide a high air flow rate inside the enclosure and a preferred embodiment of my invention utilizes a barrier deflection device in the enclosure to cause the air entering the room, whether it be only from the doorway from the decontamination chamber or from a second air intake, to flow past the highest source of contamination before entering the filtration device.

The decontamination chamber preferably includes three separated rooms including a direct change room which is contaminated with particulate and a separated clean change room, wherein the two change rooms are separated by a shower to remove the particulate from the person.

As indicated in the background, many buildings and even rooms are not easily sealed off to the outside environment. The enclosure provided as part of my method need not be sealed. Further, the doorways and the decontamination chamber also need not be sealed. While the enclosure is preferably sealed and the decontamination chamber is preferably sealed, the doorways need not be sealed since the intake openings are the doorways or nearby. Thus, whenever the term "sealed" is used in the preferred embodiments, it is intended by this wording to indicate that an attempt is made to make the room sealed, but it is not critical that these sealed conditions exist. While it is preferred that the various "airtight" conditions exist, it should be recognized that one of the prime advantages of my invention is that these seals need not be absolute. Therefore, even if there are leaks around the sealed enclosure, the use of the negative air pressure insures that air will only enter and not leave from these breaches in the barrier. It is preferred that an enclosure of film be installed to protect the walls from damage during cleaning and greater control of and greater flow through the air intakes. The air intakes can be adjusted depending upon the degree of "air-tightness" that has been achieved in the enclosure.

DESCRIPTION OF PREFERRED EMBODIMENTS

Figure 1:
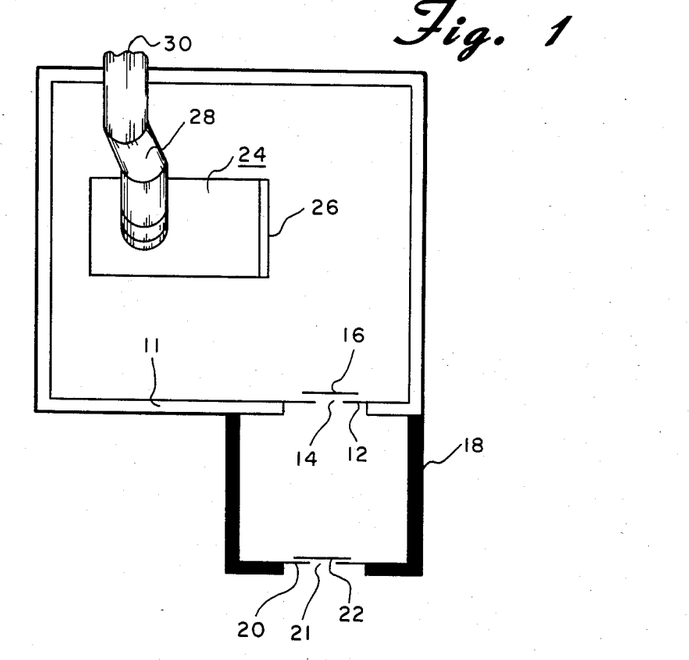
FIG. 1 is a floor plan illustrating the use of the method of this invention.

Referring now to FIG. 1, this illustrates the situation for the use of the method of this invention wherein on the site, enclosure 10 surrounds the area of high particulate accumulation. This illustrates the embodiment wherein a sealed room is constructed around the area of contamination in its most simple configuration. For the purposes of this figure and of the other floor plan, FIGS. 1 through 5, the floor and ceiling are in all cases present to complete the enclosure. However, it should be understood that air intakes or inlets, control for air flow, the exit ports or outlets and even the doorways can be constructed to enter through the roof or through the floor in the same fashion as they are illustrated as passing through the walls in the illustrative figures. Whenever the term "wall" is used, it is intended to include any of the four vertical walls as well as the ceiling or the floor. Doorway 15 is installed in wall 11 of enclosure 10. The doorway 15 is provided with what will be generally referred to throughout the Specification as a "flap seal" which includes a two foot by five foot opening 14 about a foot off the floor in a sheet of plastic film 12, such as polyethylene, plasticized polyvinyl chloride or the like, sealed across the existing door 15 frame of the enclosure. In this embodiment, a polyethylene sheet 12 is sealed across a door frame with opening 14 cut through the film. Flap 16, larger in all dimensions than opening 14, of the same film, is attached to the door frame above opening 14 and hangs over the full length of the opening such that air may pass into room 10 through opening 14, pushing flap 16 inwardly. However, the configuration is such that once the air flow ceases and positive air pressure develops in the enclosure, the flap falls into place and air is prevented from escaping in the opposite direction to the environment outside of room 10. This type of flap seal will be used extensively throughout the various embodiments of this invention. Decontamination chamber 18 is constructed to allow entrance to and exit from enclosure 10 through doorway 15 into the chamber, closed from the outside with flap 22 over opening 21 in film barrier 20. Filtration system 24 is placed in the contamination area in enclosure 10 such that air entering port 26 is filtered and expelled to the environment with 99.99 percent of the particulate contaminants of 0.3 micron size removed through air communication duct 28 to exit vent 30. The filtration system 24 in FIG. 1 is illustrated larger than scale and is preferably placed in a part of the enclosure near the contamination source such that the particulate, such as asbestos coatings, may be removed while maintaining the particulate concentration in the work area at a satisfactory level. This is particularly effective when the source of contamination, typically the work area, is between the persons and the filtration system 24. The substantial air flow being pulled into the filtration means provides a continuous vacuum in enclosure 10 drawing air through the flap seals and maintaining a negative pressure in the room at all times.

Figure 2:
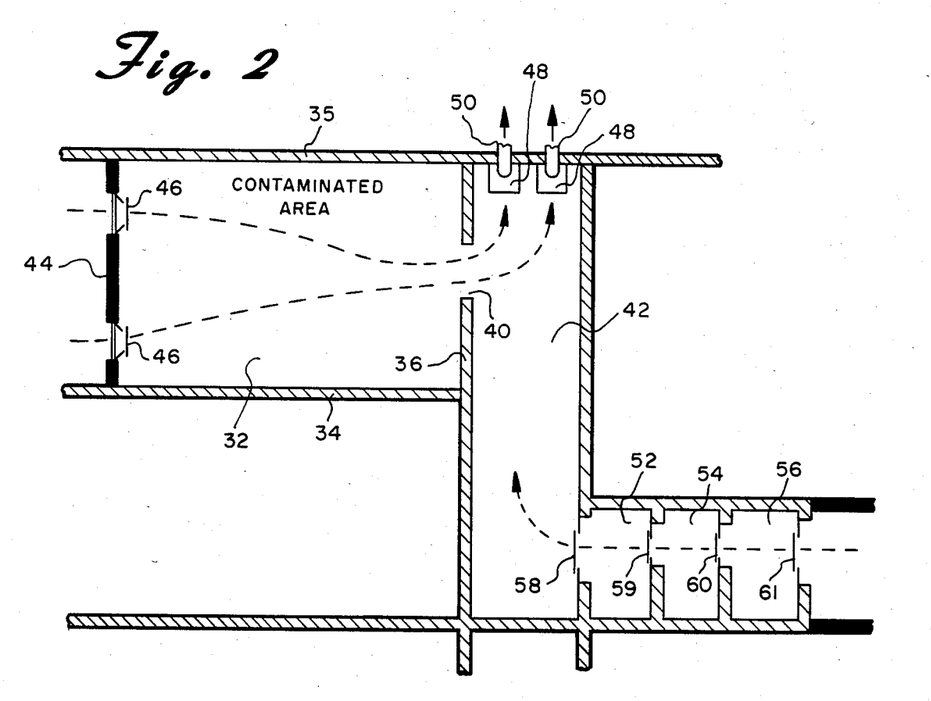
FIG. 2 is an additional floor plan illustrating the erection of the decontamination entering chamber being located away from the contaminated area.

In FIG. 2, a somewhat more complicated configuration is illustrated, utilizing the method of this invention. In this situation, the contaminated area is in room 32 for which there are three permanent walls 34, 35 and 36 with doorway 40 opening in wall 36 from room 32 to hallway 42. It is important that doorway 40 be maintained in an open condition and any doors are removed or fixed in an open position. The position of the walls and wall 36 form a barrier to cause the air to flow past the work area and away from the workers who should start at wall 44. Wall 44 is a temporary film wall from floor to ceiling with two flap seals 46 providing for controlled air flow into room 32, past the contaminated area through doorway 40 and into hallway 42 to a pair of filter systems 48, expelling air through exit ports 50 with the general air flow shown by the dotted lines and arrows. Located on the opposite end of hallway 42 is the decontamination system, including a series of three chambers, dressing room 52, shower room 54 and dressing room 56, containing various decontamination equipment and safety devices including showers, clothes discard systems and vacuum removal, with each successive decontamination chamber being cleaner and cleaner toward the outside environment as each is equipped and separated from the other with flap seals 58 through 61 These flap seals are large enough that a person can enter and leave through the opening by merely pushing the flap aside. The doorway between hallway 42 and decontamination chamber 52 is equipped with a flap seal 58 as is chamber 56 with flap seal 61, to the outside environment. Again, air flow is allowed through the flap seals, through the decontamination chambers, into hallway 42, to be pulled to filter systems 48 to be expelled into the atmosphere after particulate contamination has been removed. In this configuration, in essentially all areas of the decontaminated area, the particulate is being drawn away from the work place, out of the room and away from persons working in room 32. The flap seals 46 are equipped with adjustable inlet ports so that the amount of air flow may be controlled so as to balance and maintain sufficient flow from the decontamination chambers. Using an SEM it is determined that the fiber content at completion is well below 0.01 fibers per cc, when counting all fibers as small as those less than 0.1 micron in diameter and as short as 0.5 micron in length. During cleaning the average fiber count is about 2 fibers per cc with no fiber release to the clean areas.

Figure 3:
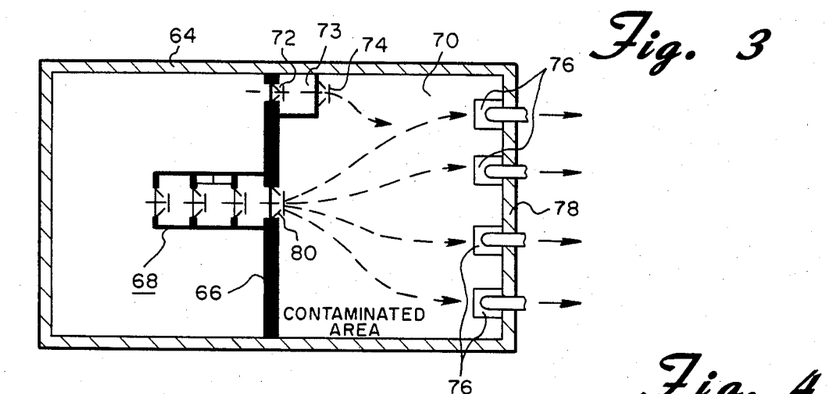
FIG. 3 is an additional floor plan illustrating the use of multiple air filtration units located on the far wall away from the air vents and decontamination chambers.

In FIG. 3 room 64 is divided by temporary film wall 66 to enclose the area of particulate contamination. Decontamination system 68 includes three chambers with appropriate flap seals separating each chamber from the outside environment, the balance of room 64, and the contaminated enclosure 70. This decontamination chamber is similar to that constructed and illustrated in FIG. 2. As air intake is located in wall 66 with a flap seal 72 and further equipped with a second decontamination chamber 73 separated by flap seal 74 from enclosure 70. Chamber 73 is used to bag and remove debris, tools, discarded clothes and the like. An effective way of controlling the air flow into the room is by varying the size of the opening in the flap seal. Filter systems 76 are located in wall 78 passing purified air into the environment and drawing a substantial vacuum on enclosure 70. In this configuration, air is drawn through the decontamination system 68 through doorway 80 equipped with a flap seal while air is controlled and also enters through chamber 73 and flap seals 72 and 74, passing through the filter systems and then to the environment. In this configuration, essentially the entire room is continually flushed with high air volume flow, removing particulate as it is generated and preventing a critical buildup. The air is changed at least every 10 to 15 minutes.

Figure 4:
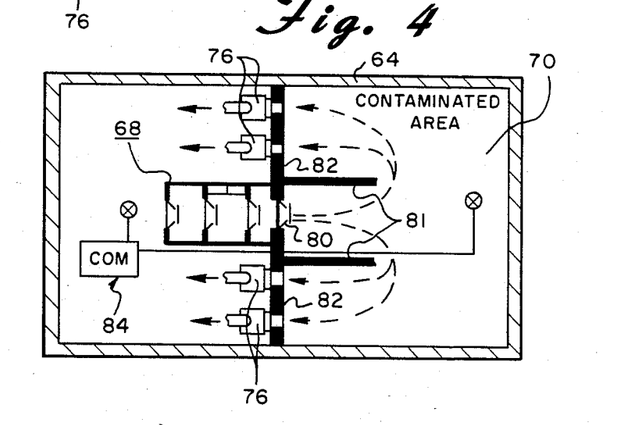
FIG. 4 is an additional floor plan illustrating the method of this invention illustrating the use of a barrier to direct air flow past the contaminated area wherein the filtration units are on the same wall as the air vent and the decontamination chamber.
Figure 5:
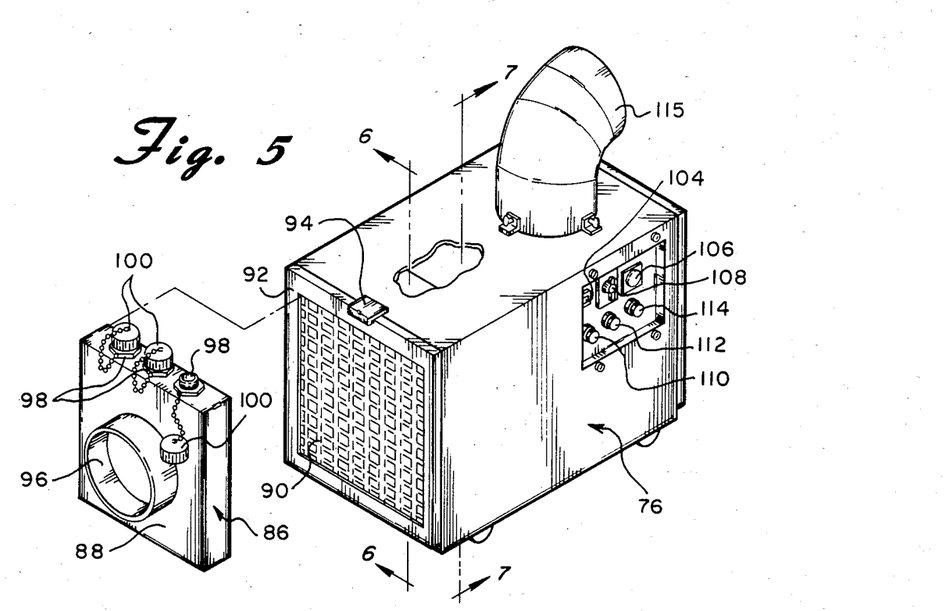
FIG. 5 is an exploded perspective view of the filtration device of this invention.

In FIG. 4, room 64 is again divided, this time by wall 82 in which filter systems 76 are installed pulling air flow from contaminated enclosure 70 into the outside environment after it has been filtered, the environment in this case including the balance of room 64. Decontamination system 68 is installed in the same fashion as that of the system in FIG. 3. Doorway 80 is equipped with a flap seal device to allow air to enter enclosure 70. Walls 81 act as a barrier to cause air flow to pass through most of the room before being drawn out of filter systems 76. Monitor system 84 includes a monitor station connected to strip chart or computer at a command center, which checks and instantly monitors at point "x"'s, to determine the particulate concentration not only in the contaminated area, but in the environment outside of the decontamination chamber system 68.

A filter system of this invention is illustrated in FIGS. 5 through 8. Entrance port system 86 includes frame 88 which essentially covers the square filter surface 90, protected by a grid and held in place by frame 92 hingeably attached from below to open downwardly by unclipping latch 94. Frame 88 essentially covers the filter surface except for open major port 96 through which most of the air flow passes to the filter system. Frame 88 is also equipped with three smaller ports 98, each equipped with a detachable cap 100. Non-collapsible vacuum hoses 101 may be attached to each port 98 with the open end attached to a vacuum cleaner 103 to push particulate directly to entrance port system 86 to the space inside frame 88, known as the entrance chamber, and directly to filter surface 90. Ports 98 open into the air stream entering port 96 so that air flow from ports 98 joins and is drawn into the air stream and into the filter system 76. Control panel 102 includes the capability of measuring the filter condition on filter gauge 104 (Dwyer Model Number 5003) and lapse time of filter use on a lapse time indicator 106 (Cramer Model Number 635) with timer 108 (Dayton Model Number 2E052A, springwound 0–12 hours). Light indicators on panel 102 include yellow light 110 indicating dirty filter, red light 112 indicating unit shut down, and green light 114 indicating normal run (all Gould Model Number H33PR2 120 volts).

Figure 6:
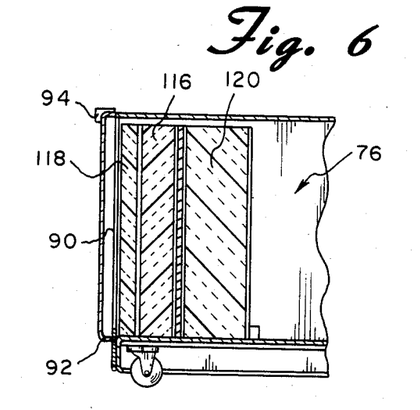
FIG. 6 is a partial cut-away taken along line 6—6 of FIG. 5 showing the interior details of the filtration device of my invention.

FIG. 6 is a cross-sectional view of the filter section of filter system 76, showing filter surface 90 wherein the particulate contaminated air penetrates first filter 116, a prefilter with 20% efficiency, 10 microns and larger, after which it reaches filter 118, mid-range 35% efficiency for 5 to 10 micron material after which it finally penetrates filter 120, a HEPA filter with 99.99% efficiency of 0.3 micron material.

Figure 7:
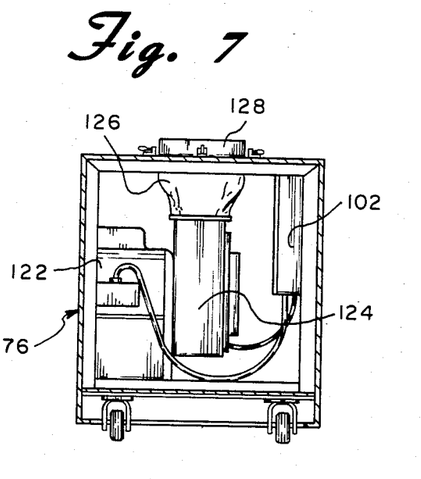
FIG. 7 is a cross-sectional view taken along line 7—7 of FIG. 5.

In FIG. 7, an additional cross-sectional view normal to that of FIG. 6 illustrates blower motor 122, a one and one-half HP frame number 56 HZ 120 volt single phase motor, which powers blower 124 a Dayton Model Number 4C119, direct drive cylindrical fan blower, to draw air through the filters and pass it through flexible conduit 126 to connector 128 which holds and sealably connects flexible neoprene connector tubing 115 (shown in FIG. 5) for passage of filtered air to the outside atmosphere.

Figure 8:
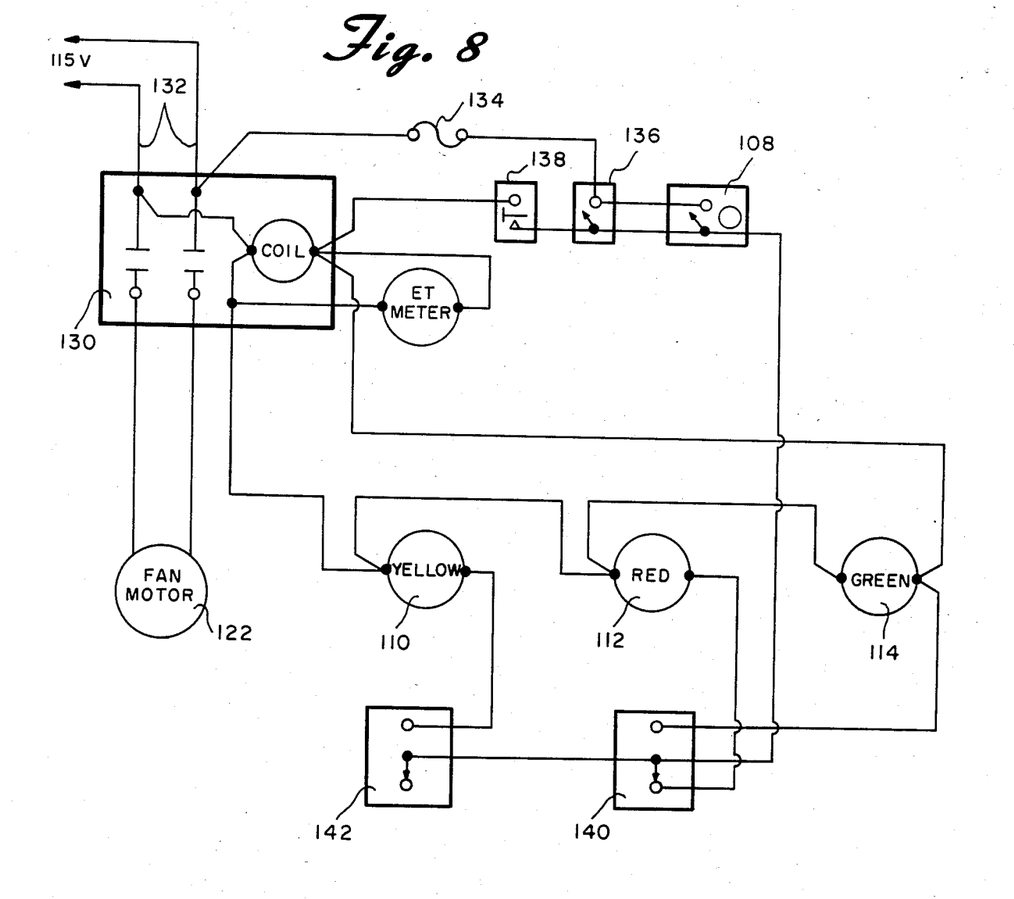
FIG. 8 is a schematic circuit diagram of the control system for the filtration device of FIG. 5.

In FIG. 8, a schematic circuit diagram illustrates the control of filter system 76 through main relay 130 (Dayton Model Number 6X598DPST 35 amp mercury) powered through control power cord 132 to operate fan motor 122 as controlled by 3 amp panel fuse 134 and on/off switch 136, as well as start button 138 (Momentary push switch spst 15 amp) and timer 108, with operation indicated by yellow light, 110, red light 112, and green light 114. The continued performance of the filter system is controlled on the low pressure side by low pressure switch 140 (Dwyer Model Number 1910-1) set at 1.1″ WG and on the high pressure side by high pressure switch 142 (Dwyer Model Number 1910-5) set at 2.75″ WG. The pressure sensing controls are connected with 3/16 inch tubing and all electrical controls are interconnected by wiring as shown. As operated, upon plugging the unit into 120 volt power, the unit can be made ready for start-up by placing on/off switch 136 to the "on" position. Start button 138 is depressed for five seconds and the unit should start. The lights will indicate the performance of the system, which will be automatically shut down if there is insufficient filtration or if the pressure drop through the filters has become too high due to clogging. The yellow light will come on in case of dirty filters, an excessive or blocked intake duct or the chart indicates a certain flow at the pressure shown. The red light comes on but start-up has not been attempted. If after start-up the red light comes on, there is a shut down with the possible causes of power interruption, filters not in place, excessive or blocked up down stream or possible other reasons. A green light indicates normal operation. Audible alarms are included.

The advantages of this system include preventing fiber release that might occur in an unforseen accident, for example through a leak in a damaged barrier, the removal is done in the contaminated area toward the filters, thereby removing fibers away from the workers' breathing zones, allowing the use of more comfortable half-face respirators rather than cumbersome air line masks, overall reduction in fiber counts in the work area, and reduction of humidity buildup within the environment. A particular advantage is the entrance port system which allows for the use of commercial vacuums bringing the entrance port to the filtration system in direct vacuum line communication to the work area or allows clean up of the area while the air is continued to be maintained in a clean condition.

While I have described my invention in connection with specific embodiments, it is to be clearly understood that this description is made only by way of example and not of limitation to the scope of my invention as set forth in the following claims.

I claim:

1. A method of establishing a negative pressure environment within an existing building for removing dangerous solid materials from the building, said method comprising:
   (1) defining an enclosed space within said building using existing wall structure to define at least a portion of said enclosed space;
   (2) establishing at least one flow path for air to enter said enclosed space;
   (3) continuously evacuating air from said enclosed space through a filter means to remove dangerous solid materials from said evacuated air and to establish a negative air pressure in said enclosed space so that air exiting said space passes through said filter means; and
   (4) sealing said flow path against air exiting from said air space to the exterior of said enclosed space in the event of loss of negative air pressure in said enclosed space.

2. The method of claim 1, wherein the air evacuated from said enclosed space passes adjacent to a high level of dangerous solid materials within said enclosed space.

3. The method of claim 1, wherein the rate of evacuation of air from said enclosed space is sufficient to change the air within the enclosed space in about 5 to 25 minutes.

4. The method of claim 3, wherein the rate is about 10 to 20 minutes.

5. The method of claim 4, wherein the rate is about 15 minutes.

6. The method of claim 1, further comprising erecting temporary wall means to define said enclosed space.

7. The method of claim 1, wherein the enclosed space is essentially airtight.

8. A system for establishing a favorable environment for removing dangerous solid materials, said system comprising:
   wall means enclosing a defined air space within a building, said wall means including at least one inlet for air to enter said air space and an outlet for air to exit from said air space;
   filter means for filtering air in said air space;
   air moving means for producing a negative air pressure within said air space and for drawing air into said space through said inlet and for moving air through said filter means in advance of moving air through said outlet; and
   sealing means for sealing said inlet against air exiting from said air space to the exterior of said air space in the event of loss of negative air pressure in said air space.

9. The system of claim 8, further comprising a second inlet into said air space and a decontamination chamber communicating with the air space through said second inlet, said decontamination chamber including a first room, a second room, and a shower room interconnecting said first room and said second room.

10. The system of claim 9, further comprising a second decontamination chamber to facilitate removal of waste and equipment and intake means defined by said wall means to allow air flow to enter into the air space through the second decontamination chamber.

11. The system of claim 8, wherein said wall means includes at least one existing wall of said building and a temporary wall erected to enclose the air space.

12. The system of claim 8, wherein a barrier deflection means is placed in the air space to cause the air entering the air space to flow past the source of a high level of contamination before entering the filter means.

13. The system of claim 8, wherein the wall means comprises walls, a ceiling and a floor.

14. The system of claim 8, wherein the wall means comprises a flexible film wall.

15. The system of claim 8, wherein the air space is essentially airtight.

16. The system of claim 8, wherein the sealing means comprises a flexible film flap covering said inlet for essentially unobstructed air flow into the air space and for blocking air flow from the air space when there is a loss of negative air pressure in said air space.

17. The system of claim 16, wherein the inlet includes at least one opening of a size and shape to allow a person to step through said inlet covered by said flexible film flap.

* * * * *

REEXAMINATION CERTIFICATE (1075th)
United States Patent [19]
Natale

[11] B1 4,604,111
[45] Certificate Issued Jun. 6, 1989

[54] PARTICULATE CONTAMINATION CONTROL METHOD AND FILTRATION DEVICE

[76] Inventor: Anthony Natale, 450 S. Fork Landing Rd., Maple Shade, N.J. 08052

Reexamination Request:
No. 90/001,227, Apr. 22, 1987

Reexamination Certificate for:
Patent No.: 4,604,111
Issued: Aug. 5, 1986
Appl. No.: 735,716
Filed: May 20, 1985

Reexamination Certificate B0 4,604,111 issued Aug. 5, 1986.

Related U.S. Application Data

[63] Continuation of Ser. No. 323,730, Nov. 23, 1981, abandoned.

[51] Int. Cl.⁴ .................................. B01D 46/42
[52] U.S. Cl. .................................. 55/97; 49/68; 55/385 A; 55/419; 55/467; 98/33.1; 160/332; 160/DIG.8; 312/1; 312/3
[58] Field of Search ............. 55/97, 274, 385 A, 419, 55/467, DIG. 29, 212, 213, 420; 98/33.1, 34.5, 42.02, 36, 42.05, 87; 49/68; 160/332, DIG. 8; 128/1 R; 422/120; 312/1.3

[56] References Cited

U.S. PATENT DOCUMENTS

| | | | |
|---|---|---|---|
| 2,257,516 | 9/1941 | Roche et al. | 98/115 SB |
| 2,710,574 | 6/1955 | Runion | 98/115 |
| 2,927,659 | 3/1960 | Pabst et al. | 55/274 |
| 2,983,213 | 5/1961 | Bohanon | 98/33 A |
| 3,103,426 | 9/1963 | Lantz, Jr. | 55/222 |
| 3,107,974 | 10/1963 | Potapenko | 21/53 |
| 3,121,384 | 2/1964 | Brode | 98/119 |
| 3,158,457 | 11/1964 | Whitfield | 55/385 A |
| 3,171,343 | 3/1965 | Wexler | 98/119 |
| 3,201,772 | 8/1965 | Ladusaw | 55/274 |
| 3,261,050 | 7/1966 | Caille et al. | 49/68 |
| 3,334,597 | 8/1967 | Ruskin et al. | 55/385 A |
| 3,370,404 | 2/1968 | Leeper | 55/233 |
| 3,375,640 | 4/1968 | Pelosi, Jr. | 55/276 |
| 3,439,966 | 4/1969 | Perkins et al. | 312/1 |
| 3,492,987 | 2/1970 | Parker | 128/1 R |
| 3,501,213 | 3/1970 | Trexler | 49/68 |
| 3,552,098 | 1/1971 | Cochran | 55/274 |
| 3,555,230 | 11/1971 | Trexler | 312/3 |
| 3,576,206 | 4/1971 | Trexler | 312/1 |
| 3,601,030 | 8/1971 | Bryant | 98/32 |
| 3,601,031 | 8/1971 | Abel et al. | 55/385 A |
| 3,629,999 | 12/1971 | Marsh et al. | 55/279 |
| 3,744,055 | 7/1973 | Brendgord | 312/1 R |
| 3,766,844 | 10/1973 | Donnelly et al. | 55/385 A |
| 3,875,853 | 4/1975 | Pielkenrood | 55/DIG. 29 |
| 3,936,284 | 2/1976 | Mason | 55/274 |
| 3,960,527 | 6/1976 | Goettl | 55/419 |
| 4,072,483 | 2/1978 | Doyles, Jr. | 55/419 |
| 4,086,950 | 5/1978 | Power | 160/332 |
| 4,091,719 | 5/1978 | Galloway | 55/385 A |
| 4,108,238 | 8/1978 | Vary et al. | 165/57 |
| 4,175,934 | 11/1979 | Lang et al. | 55/267 |
| 4,191,543 | 3/1980 | Peters | 55/279 |
| 4,202,676 | 5/1980 | Pelosi, Jr. et al. | 55/269 |
| 4,230,031 | 10/1980 | Pedroso et al. | 55/DIG. 18 |
| 4,237,780 | 12/1980 | Truhan | 98/115 SB |
| 4,249,463 | 2/1981 | Hornby | 55/DIG. 18 |
| 4,255,169 | 3/1981 | Leliaert et al. | 55/97 |
| 4,257,471 | 3/1981 | Thurmond, Jr. | 160/332 |
| 4,267,769 | 5/1981 | Davis et al. | 55/DIG. 29 |
| 4,294,595 | 10/1981 | Bowerman | 55/274 |
| 4,304,224 | 12/1981 | Fortney | 55/215 |
| 4,312,396 | 1/1982 | McKinnon et al. | 160/332 |
| 4,384,606 | 5/1983 | Johnson et al. | 160/332 |

FOREIGN PATENT DOCUMENTS

| | | | |
|---|---|---|---|
| 2440221 | 3/1976 | Fed. Rep. of Germany | 55/385 A |
| 1396883 | 6/1975 | United Kingdom | |

OTHER PUBLICATIONS

"Industrial Clean Rooms", Air Conditioning Heating and Ventilating, vol. 60, Dec. 1963, pp. 58–63.

Sawyer, R. N. & Spooner, C. M., EPA 450/2-78-014, "Sprayed Asbestos Containing Materials in Buildings", Jan. 1978.

EPA, Welker et al., Evaluation of a Commercial Vacuum System for the Removal of Asbestos, May 1980, 74 pages.

Chiljean et al., Asbestos Abatement/Control: Guidance Manual, pp. 1.1–12.1.

Sawyer and Swoszowski, Jr., Asbestos Abatement in Schools: Observations and Experiences, Jun. 1978, B 00661–00692.

Nicholson, Control of Sprayed Asbestos Surfaces in School Buildings: A Feasibility Study, Jun. 15, 1978, 92 pages.

Hume, "Guidelines for the Justification of New Clean Rooms," Contamination Control, May 1968.

Berwald and Nicholson, A Guide for the Removal of Asbestos, Jul. 1979, B 01625–B 01638.

"Asbestos Removal the Yale Way," Demolition ABC, Oct./Nov. 1977.

Peters and Peters, "Controls and Protection," Sourcebook on Asbestos Diseases, pp. C16–C21.

HEW/NIH, Asbestos: An Information Resource, May 1978, pp. 1–105, Appendices.

Sax, Dangerous Properties of Industrial Materials (5th ed.), 1979, pp. 40–89, 115.

American National Standards Institute, American National Standard Fundamentals Governing the Design and Operation of Local Exhaust Systems, Aug. 31, 1971, pp. 1–63.

Glasstone and Sesonske, Nuclear Reactor Engineering, pp. iii–546–549.

NEW/NIH, Recombinant DNA Research Guidelines, Federal Register, Jul. 7, 1976, pp. 27902–27943.

HEW/NIH, Recombinant DNA Research: Proposed Revised Guidelines Federal Register, Sep. 27, 1977 (Part III), pp. 49596–49606.

Laboratory Safety Monograph: A Supplement to the NIH Guidelines for Recombinant DNA Research, Jan. 1979, 227 pages.

Dick and Hanel, Jr. Design Criteria for Microbiological

Facilities at Fort Detrick, vol. II, "Design Criteria," Jun. 1970, pp. i–2.23A.
Mohr and Rowe, Fiberglass, 1978, pp. 136–155.
American Association for Contamination Control, "Tentative Standard for HEPA Filters," 1968, pp. 1–9.
EPA, Asbestos–Containing Materials in School Buildings: A Guidance Document, Part 1, Mar. 16, 1979, pp. 1–64.
EPA, Asbestos–Containing Materials in School Buildings: A Guidance Document, Part 2, "Sprayed Asbestos–Containing Materials in Buildings: A Guidance Document," Mar. 1978, pp. i–II–5–4, Appendices.
NIH, Laboratory Safety Monograph: A Supplement to the NIH Guidelines for Recombinant DNA Research, Jul. 1978, 226 pages.
Herald–Leader, Feb. 1979, "School's Ceiling to be Removed".
Lexington Herald, Feb. 22, 1979, "Calamity Days Granted for Asbestos Removal", Specialized Techniques Used in Asbestos Work.
Lexington Herald, Feb. 22, 1979, "Asbestos Going Out, Though Funds Short."
Federal Register, vol. 38, No. 66, Apr. 6, 1973, pp. 8829–8830.
Courier–Journal, May 1979, "Asbestos Free School Brings a Celebration," School is Free of Asbestos, Carroll Grants $35,000 for PHS Repair, Asbestos Removal is Crucial.
"Prestonburg School Faces Problem of Having Asbestos Ceilings Removed," Asbestos Checked at School for Possible Health Hazard.
The Courier–Journal, Nov. 3, 1978, "Consultant Asks Study of Hazards of Asbestos."
Herald–Dispatch, Jun. 14, 1978, "Team Seeks Link Between Asbestos and Birth Defects," Scientist Proves Fibers Penetrate Linings.
"Floyd County Schools May be Sued Over Delay on Removing Asbestos," Jan. 24, 1979.
"Specialized Techniques Used in Asbestos Work."
Asbestos, vol. 1, Properties, Applications, and Hazards, pp. 279–304.
Asbestos Forum.
RCA Family Newsletter, Sep. 17, 30, 1980.
Lory, Coin et al., Technical Report R883, Civil Engineering Laboratory, Management Procedure for Assessment of Friable Asbestos Insulating Material, pp. 1-7-15.
1972 "Safety and Health in Shipbuilding and Ship Repairing", see paper by A. A. Cross, pp. 93–101.
1973 Federal Register, vol. 38, No. 135, Jul. 16, 1973, pp. 18900–18903.
1973 "The industrial Environment-Its Evaluation and Control".
1973 Federal Register, vol. 38, No. 144, Jul. 27, 1973, pp. 20074–20076.
1977 Nuclear Air Cleaning Handbook, pp. iii–v, 12–17.
1977 Request for Proposal Naval Supply Center RFPN62474–77–R–3701, Feb. 14, 1977.
1977 Technical Memorandum, Apr. 1977.
1978 Invitation for Bids: Treasury Dept., U.S. Assay Office BM–SF–78–17.
1977 "Environmental Impact Statement", Oct., 1977, U.S. Dept of Health, Education & Welfare, DHEW Publication No. (NIH) 1489, pp. 51, 52.
1979 *Asbestos*, The Universities Press, Belfast, N. Ireland, p. 295.
1980 Hamilton Local Schools Bid Speculations, Special Conditions.
1980 Bid Invitation 129952–80–A–0037 Greensboro, N.C. Post Office, published Jun. 18, 1980 (and drawings).
1980 Asbestos Control Technology Inc., Literature re "Micro–Trap", and Invoices and Checks.
1984 Asbestos Removal & Control by Anthony Natale, et al.

*Primary Examiner*—Tim R. Miles

[57] ABSTRACT

A negative pressure method and apparatus for protection from airborne asbestos and other particulate contamination is disclosed, including an enclosure with doorways and decontamination chambers with an air intake through the decontamination chambers with at least one filtration unit flow connected with the enclosure, with a blower to pull air into the filtration unit and dispelling the filtered air to the atmosphere. A high volume air flow intake is maintained with a significant negative air pressure in the enclosure. A filtration device is provided with multiple entrance ports providing for a large flow of air through the body of the room together with individual entrance ports to receive the discharge from separate vacuum cleaners.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 66, through column 4, line 37:

In order to solve the substantial safety problems described above, I have invented a method of containing and lowering the level of particulate contamination in an area that is environmentally in communication with a source generating a high level of particulate contamination harmful to the human body either on a short term or long term basis. In particular, this method is suitable to aid in protection of the persons actually in an area generating a high level of particulate contamination, such as when an area or room includes a pipe, wall or ceiling with an asbestos containing coating in the process of removal. My method includes utilizing an existing enclosure or providing an enclosure around the source of particulate generation. This enclosure is preferably large enough to include the entire area being cleaned and preferably includes at least one sealed film enclosure wall. An existing doorway is used or a doorway is placed in a wall or conceivably in a ceiling or floor of the enclosure to provide entrance and exit to and from the enclosure. A decontamination chamber space, connected to the doorway is provided. Preferably, this [contamination] *decontamination* chamber includes three separated rooms, so as to essentially eliminate the possibility of carrying the particulate contamination to the outside environment. A second doorway is provided in a wall of the decontamination chamber to provide entrance to and exit from that chamber to the outside environment. At least one air intake is provided in the enclosure to allow air flow to enter into the enclosure through the decontamination chamber. Whenever the term "wall" or "walls" is used, it is intended to include the ceiling, the floor, and any of the vertical walls of the room and as such is not intended to be a limitation on the location of a door, an air intake or any of the other elements of the method of my invention. The air intakes also preferably prevent air flow from inadvertently leaving the enclosure. A controlling system is preferably provided to control the amount of air entering through the intakes so that there is substantial air flow entering each intake.

Column 6, line 21, through column 7, line 9,

Referring now to FIG. 1 this illustrates the situation for the use of the method of this invention wherein on the site, enclosure 10 surrounds the area of high particulate accumulation. This illustrates the embodiment wherein a sealed room is constructed around the area of contamination in its most simple configuration. For the purposes of this figure and of the other floor plan, FIGS. 1 through 5, the floor and ceiling are in all cases present to complete the enclosure. However, it should be understood that air intakes or inlets, control for air flow, the exit ports or outlets and even the doorways can be constructed to enter through the roof or through the floor in the same fashion as they are illustrated as passing through the walls in the illustrative figures. Whenever the term "wall" is used, it is intended to include any of the four vertical walls as well as the ceiling or the floor. Doorway 15 is installed in wall 11 of enclosure 10. The doorway 15 is provided with what will be generally referred to throughout the Specification as a "flap seal" which includes a two foot by five foot opening 14 about a foot off the floor in a sheet of plastic film 12, such as polyethylene, plasticized polyvinyl chloride or the like, sealed across the existing door 15 frame of the enclosure. In this embodiment, a polyethylene sheet 12 is sealed across a door frame with opening 14 cut through the film. Flap 16, larger in all dimensions than opening 14, of the same film, is attached to the door frame above opening 14 and hangs over the full length of the opening such that air may pass into room 10 through opening 14, pushing flap 16 inwardly. However, the configuration is such that once the air flow ceases and positive air pressure develops in the enclosure, the flap falls into place and air is prevented from escaping in the opposite direction to the environment outside of room 10. This *automatic* type of flap seal will be used extensively throughout the various embodiments of this invention. Decontamination chamber 18 is constructed to allow entrance to and exit from enclosure 10 though doorway 15 into the chamber, closed from the outside with flap 22 over opening 21 in film barrier 20. Filtration system 24 is placed in the contamination area in enclosure 10 such that air entering port 26 is filtered and expelled to the environment with 99.99 percent of the particular contaminants of 0.3 micron size removed through air communication duct 28 to exit vent 30. The filtration system 24 in FIG. 1 is illustrated larger than scale and is preferably placed in a part of the enclosure near the contamination source such that the particulate, such as asbestos coatings, may be removed while maintaining the particulate concentration in the work area at a satisfactory level. This is particularly effective when the source of contamination, typically the work area, is between the persons and the filtration system 24. The substantial air flow being pulled into the filtration means provides a continuous vacuum in enclosure 10 drawing air through the flap seals and maintaining a negative pressure in the room at all times.

Column 7, line 58, through column 8, line 15:

In FIG. 3 room 64 is divided by temporary film wall 66 to enclose the area of particulate contamination. *The area on the other side of wall 66 is open to the atmosphere through building openings, not shown.* Decontamination system 68 includes three chambers with appropriate flap seals separating each chamber from the outside environment, the balance of room 64, and the contaminated enclosure 70. This decontamination chamber is similar to that constructed and illustrated in FIG. 2. [As] *An* air intake is located in wall 66 with a flap seal 72 and further equipped with a second decontamination chamber 73 separated by flap seal 74 from enclosure 70. Chamber 73 is used to bag and remove debris, tools, discarded clothes and the like. An effective way of controlling the air flow into the room is by varying the size of the opening in the flap seal. Filter systems 76 are located in wall 78 passing purified air into the environment and drawing a substantial vacuum on enclosure 70. In this configuration, air is drawn through the decontamination system 68 through doorway 80 equipped with a flap seal while air is controlled and also enters through chamber 73 and flap seals 72 and 74, passing through the filter systems and then to the environment. In this configuration, essentially the entire room is continually flushed with high air volume flow, removing particulate as it is generated and preventing a critical buildup. The air is changed at least every 10 to 15 minutes.

Column 8, lines 16 through 33:

In FIG. 4, room 64 is again divided, this time by wall 82 in which filter systems 76 are installed pulling air flow from contaminated enclosure 70 into the outside environment after it has been filtered, the environment in this case including the balance of room 64. *The area on the other side of wall 82 is open to the atmosphere through building openings, not shown.* Decontamination system 68 is installed in the same fashion as that of the system in FIG. 3. Doorway 80 is equipped with a flap seal device to allow air to enter enclosure 70. Walls 81 act as a barrier to cause air flow to pass through most of the room before being drawn out of filter systems 76. Monitor system 84 includes a monitor station connected to strip chart or computer at a command center, which checks and instantly monitors at point "x'"s, to determine the particulate concentration not only in the contaminated area, but in the environment outside of the decontamination chamber system 68.

AS A RESULT OF REEXAMINATION, IT HAS BEEN DETERMINED THAT:

The patentability of claims 1-17 is confirmed.

New claims 18-29 are added and determined to be patentable.

*18. A method of establishing a negative pressure environment within an existing building for removing dangerous solid asbestos materials from the building, said method comprising:*

*(1) defining an enclosed space within said building using existing wall structure to define at least a portion of said enclosed space;*

*(2) establishing at least one flow path for substantial volumes of air to enter and move through said enclosed space;*

*(3) disturbing the solid asbestos materials within the enclosed space whereby dangerous asbestos solid materials become airborne within the enclosed space;*

*(4) continuously evacuating substantial volumes of air from said enclosed space through a filter means and continuously drawing substantial volumes of air into said enclosed space to remove the airborne dangerous asbestos solid materials from said evacuated air and to establish a negative air pressure in said enclosed space so that air exiting from said space passes through said filter means; and*

*(5) sealing said flow path against air exiting from said air space to the exterior of said enclosed space automatically upon loss of negative air pressure in said enclosed space.*

*19. The method of claim 18, wherein the rate of evacuation of air from said enclosed space and rate of drawing air into said enclosed space is sufficient to change the air within the enclosed space in about 5 to 25 minutes.*

*20. The method of claim 19, wherein the rate is about 10 to 20 minutes.*

*21. The method of claim 20, wherein the rate is about 15 minutes.*

*22. The method of claim 18, further comprising erecting temporary wall means to define said enclosed space.*

*23. The method of claim 18, wherein the evacuating and drawing step comprises continuously evacuating and drawing the substantial volumes of air until the fiber content of the airborne dangerous asbestos solid material is no greater than 0.01 fibers per cubic centimeter.*

*24. A system for establishing a favorable environment for removing dangerous solid asbestos materials from an existing building, said system comprising:*

*wall means enclosing a defined air space containing asbestos contamination within said building, said air space also containing airborne asbestos fibers, said wall means including at least one inlet for outside air to enter said air space and an outlet for air filtered by a filter means to exit from said air space;*

*filter means for filtering air in said air space;*

*high volume air moving means for producing a negative air pressure within said air space and for drawing large volumes of outside air into said air space through said inlet and for moving the large volumes of air through said filter means in advance of moving air through said outlet, thereby reducing the level of airborne asbestos fibers in said air space; and*

*sealing means for sealing off said inlet against air exiting from said air space to the exterior of said air space automatically upon loss of negative air pressure in said air space.*

*25. The system of claim 24, wherein said wall means includes at least one existing wall of said building and a temporary wall erected to enclose the air space.*

*26. The system of claim 25, wherein said temporary wall comprises a flexible film wall.*

*27. The system of claim 24, wherein the sealing means comprises a flexible film flap covering said inlet for essentially unobstructed air flow into the air space and for blocking air flow from the air space in response to a loss of negative air pressure in said air space.*

*28. The system of claim 27, wherein the inlet includes at least one opening of a size and shape to allow a person to step through said inlet covered by said flexible film flap.*

*29. The system of claim 27, wherein said flexible film flap is secured to said wall means above said inlet and hangs over said inlet.*

* * * * *

REEXAMINATION CERTIFICATE (2807th)

United States Patent [19]

Natale

[11] B1 4,604,111

[45] Certificate Issued  Mar. 5, 1996

[54] PARTICULATE CONTAMINATION CONTROL METHOD AND FILTRATION DEVICE

[75] Inventor: Anthony Natale, Maple Shade, N.J.

[73] Assignee: GPAC, Inc., Cinnaminson, N.J.

Reexamination Request:
No. 90/002,209, Nov. 23, 1990

Reexamination Certificate for:
Patent No.: 4,604,111
Issued: Aug. 5, 1986
Appl. No.: 735,716
Filed: May 20, 1985

Related U.S. Application Data

[63] Continuation of Ser. No. 323,730, Nov. 23, 1981, abandoned.

[21] Appl. No.: 735,716

[51] Int. Cl.$^6$ .................................................. B01D 46/42
[52] U.S. Cl. ................... 95/284; 160/332; 160/DIG. 8; 312/1; 312/3; 454/251; 49/68; 55/385.2; 55/419; 55/467; 55/487
[58] Field of Search ............................... 135/117; 98/119; 52/2 C, 2 D, 2 F

[56] References Cited

U.S. PATENT DOCUMENTS

| | | |
|---|---|---|
| 164,274 | 6/1875 | Doyle . |
| 323,587 | 8/1885 | Merriman .............................. 98/119 |
| 618,367 | 1/1899 | Stebbins . |
| 821,776 | 5/1906 | Zoller . |

(List continued on next page.)

FOREIGN PATENT DOCUMENTS

| | | |
|---|---|---|
| 1050742 | 2/1952 | France . |
| 2475679 | 2/1980 | France . |
| 2056717 | 3/1972 | Germany .............................. 98/119 |
| 2440221 | 8/1974 | Germany . |
| 53-4362 | 1/1978 | Japan . |
| 496542 | 5/1974 | U.S.S.R. . |
| 2024588 | 9/1978 | United Kingdom . |
| 2073280 | 3/1981 | United Kingdom . |
| 2062842 | 5/1981 | United Kingdom .................... 98/119 |

OTHER PUBLICATIONS

The Random House College Dictionary, Cpr. 1982, p. 1186 Revised Edition.
Work is Dangerous to your Health, Nov. 1973.
Management Procedure for Assessment Friable Asbestos Jun. 1979.
Sourcebook on Asbestos Diseases 1980.
Dept. of Navy Nimitz Library, Annapolis, Md. Aug. 1978.
Federal Register, Jul. 16, 1973.
The Industrial Environment etc. 1973.
Federal Register, Jul. 27, 1973.
Nuclear Air Cleaning Handbook 1977.
Request for Proposal Naval Supply Center RFPN62474-77-R-3701, Feb. 14, 1977.
Technical Memorandum, Apr., 1977.
Invitation for Bids: Treasury Dept. U.S. Assay Office BM-SF-78-17 1978.

(List continued on next page.)

*Primary Examiner*—Tim R. Miles

[57] ABSTRACT

A negative pressure method and apparatus for protection from airborne asbestos and other particulate contamination is disclosed, including an enclosure with doorways and decontamination chambers with an air intake through the decontamination chambers with at least one filtration unit flow connected with the enclosure, with a blower to pull air into the filtration unit and dispelling the filtered air to the atmosphere. A high volume air flow intake is maintained with a significant negative air pressure in the enclosure. A filtration device is provided with multiple entrance ports providing for a large flow of air through the body of the room together with individual entrance ports to receive the discharge from separate vacuum cleaners.

U.S. PATENT DOCUMENTS

| | | | |
|---|---|---|---|
| 932,909 | 8/1909 | Saunders . | |
| 1,194,527 | 8/1916 | McNamara . | |
| 1,392,870 | 10/1921 | Fessler . | |
| 1,465,711 | 8/1923 | Gray . | |
| 1,531,473 | 3/1925 | Barbour | 135/117 |
| 1,589,987 | 6/1926 | Russell . | |
| 1,623,286 | 4/1927 | Strahan | 98/119 |
| 1,699,094 | 1/1929 | Chadirjian et al. | 135/117 |
| 1,800,583 | 4/1931 | Wolf . | |
| 1,813,703 | 7/1931 | Kattmann | 135/117 |
| 1,820,412 | 8/1931 | Warren . | |
| 2,011,754 | 8/1935 | Cornelius . | |
| 2,100,072 | 11/1937 | Eilber et al. . | |
| 2,122,532 | 7/1938 | Mims et al. . | |
| 2,161,412 | 6/1939 | Gregg et al. . | |
| 2,210,458 | 8/1940 | Keilholtz . | |
| 2,224,878 | 12/1940 | Morrison . | |
| 2,245,859 | 6/1941 | Hunter . | |
| 2,252,784 | 8/1941 | Powers . | |
| 2,299,987 | 10/1942 | Hunter . | |
| 2,677,629 | 5/1954 | Buck . | |
| 2,737,879 | 3/1956 | Cooke et al. | 98/119 |
| 2,776,022 | 1/1957 | Beller . | |
| 2,798,422 | 7/1957 | Bourque | 98/119 |
| 2,979,754 | 4/1961 | Harris . | |
| 3,111,301 | 11/1963 | Ruegsegger . | |
| 3,204,649 | 9/1965 | Johnson | 135/117 |
| 3,215,560 | 11/1965 | Kredit . | |
| 3,222,707 | 12/1965 | Allenbaugh . | |
| 3,254,457 | 6/1966 | Gedney | 52/2 D |
| 3,277,638 | 10/1966 | Soltis . | |
| 3,371,445 | 3/1968 | Herr et al. . | |
| 3,384,000 | 5/1968 | Fuller . | |
| 3,403,616 | 10/1968 | Nelson . | |
| 3,407,719 | 10/1968 | Temple et al. | 98/119 |
| 3,500,655 | 3/1970 | Lyons . | |
| 3,505,989 | 4/1970 | Truhan . | |
| 3,510,905 | 5/1970 | Bannert . | |
| 3,511,162 | 5/1970 | Truhan . | |
| 3,526,066 | 9/1970 | Hagar et al. . | |
| 3,589,268 | 6/1971 | Steiner . | |
| 3,682,084 | 8/1972 | Tarnoff . | |
| 3,711,993 | 1/1973 | Liesch et al. . | |
| 3,871,845 | 3/1975 | Clarke et al. . | |
| 3,893,272 | 7/1975 | Plom . | |
| 3,903,869 | 9/1975 | Bancalari . | |
| 3,947,237 | 3/1976 | Leisenberg . | |
| 3,950,646 | 4/1976 | Whitlock . | |
| 3,978,547 | 9/1976 | Lawson . | |
| 3,990,532 | 11/1976 | Robinson . | |
| 4,036,614 | 7/1977 | Demarco . | |
| 4,050,368 | 9/1977 | Eakes . | |
| 4,057,464 | 11/1977 | Mair et al. . | |
| 4,064,570 | 12/1977 | Kim . | |
| 4,094,336 | 6/1978 | Urschel et al. . | |
| 4,121,562 | 10/1978 | Grott . | |
| 4,164,901 | 8/1979 | Everett . | |
| 4,165,993 | 8/1979 | McCarthy et al. . | |
| 4,166,524 | 9/1979 | Price et al. . | |
| 4,170,930 | 10/1979 | Lind . | |
| 4,171,595 | 10/1979 | Tucker . | |
| 4,175,481 | 11/1979 | Burgess, Jr. . | |
| 4,193,844 | 3/1980 | Neumann et al. . | |
| 4,196,719 | 4/1980 | Skrivseth . | |
| 4,203,485 | 5/1980 | Zilbermann et al. . | |
| 4,205,412 | 6/1980 | Weber . | |
| 4,243,486 | 1/1981 | Neumann et al. . | |
| 4,259,032 | 3/1981 | Kuhner . | |
| 4,269,255 | 5/1981 | Nailor et al. . | |
| 4,284,236 | 8/1981 | Bradshaw . | |
| 4,295,416 | 10/1981 | Gorchev et al. . | |
| 4,298,322 | 11/1981 | Anders et al. . | |
| 4,312,388 | 1/1982 | Hager et al. . | |
| 4,338,868 | 7/1982 | Lientz . | |
| 4,400,154 | 8/1983 | Lientz . | |
| 4,922,806 | 5/1990 | Newman et al. | 98/119 |

OTHER PUBLICATIONS

Environmental Impact Statement, Oct., 1977 U.S. Dept. of Health, Education & Welfare.
Asbestos 1979.
Hamilton Local Schools Bid Speculations–Special Conditions Oct. 1980.
Asbestos Control Technology Inc. literature re "Micro–Trap" and invoices and checks 1980.
Asbestos Removal & Control by Anthony Natale, et al. 1984.
Environmental Consulting & Testing Reports Aug. 1980.
Design Techniques for Industrial Clean Rooms Dec. 1963.
"Device Cleaning", A. R. Fabrello and H. H. Heninger, IBM Technical Disclosure Bulletin, vol. 21, No. 1, Jun. 1978.
"Now–Total Air Cleaning", Textile World, Sep. 1963, pp. 53–54.
"Clean Portable Downflow Booth", Controlled Environment Equipment Corp. Product Bulletin, 1966.
"The Farr DF/48 Clean Booth", FARR Company Product Data Sheet, 1964.
"Design Specifications For Prefabricated Air Showers", Moore & Hanks Company, El Monte, California.
"Asbestos Exposure In a Yale Building", Robert N. Sawyer, Environmental Research, May 25, 1976, pp. 146–169.
"Design, Construction, and Testing of High–Efficiency Air Filtration Systems for Nuclear Application", C. A. Burchsted and A. B. Fuller, Jan. 1970, Oak Ridge National Laboratory.
"Asbestos Exposure and Control", Puget Sound Naval Shipyard, 1970.
"Dust Control Techniques in the Asbestos Industry", J. Goldfield and F. Brandt, Dec. 1974, pp. 799–808.
"A Model For Asbestos Removal", V. Osborne and D. Osborne, Professional Safety, Dec., 1975, pp. 28–31.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–43 are cancelled.

* * * * *